(12) United States Patent
Yuan et al.

(10) Patent No.: US 10,312,764 B2
(45) Date of Patent: Jun. 4, 2019

(54) FIXING DEVICE FOR JUNCTION WIRES OF STATOR OF MOTOR

(71) Applicant: Chicony Power Technology Co., Ltd., New Taipei (TW)

(72) Inventors: Shao-Chung Yuan, New Taipei (TW);
Hui-Hsin Tsai, New Taipei (TW);
Yin-Jao Luo, New Taipei (TW);
Shih-Wei Hung, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 186 days.

(21) Appl. No.: 15/451,373

(22) Filed: Mar. 6, 2017

(65) Prior Publication Data

US 2018/0198344 A1    Jul. 12, 2018

(30) Foreign Application Priority Data

Jan. 6, 2017   (TW) .............................. 106100504 A

(51) Int. Cl.
*H02K 3/38*     (2006.01)
*H02K 3/28*     (2006.01)
*H02K 3/52*     (2006.01)

(52) U.S. Cl.
CPC ................. *H02K 3/38* (2013.01); *H02K 3/28* (2013.01); *H02K 3/522* (2013.01); *H02K 2203/09* (2013.01)

(58) Field of Classification Search
CPC ........ H02K 2203/09; H02K 3/28; H02K 3/38; H02K 3/522

USPC ........................................................... 310/71
See application file for complete search history.

(56) References Cited

U.S. PATENT DOCUMENTS

| | | | |
|---|---|---|---|
| 5,828,147 A | 10/1998 | Best et al. | |
| 7,219,417 B2 | 5/2007 | Kobayashi et al. | |
| 7,948,130 B2 | 5/2011 | Kitagawa | |
| 8,183,728 B2 | 5/2012 | Schaflein et al. | |
| 8,373,321 B2 | 2/2013 | Lee et al. | |
| 8,878,407 B2 | 11/2014 | Ikura | |
| 8,922,080 B2 | 12/2014 | Nakagawa | |

(Continued)

FOREIGN PATENT DOCUMENTS

| | | |
|---|---|---|
| CN | 102782995 A | 11/2012 |
| DE | 102010039335 A1 | 2/2012 |

(Continued)

*Primary Examiner* — Alex W Mok
(74) *Attorney, Agent, or Firm* — CKC & Partners Co., LLC

(57) ABSTRACT

A fixing device for junction wires of a stator of a motor includes a box and flat conductors. The box has circular grooves radially arranged at a side of the box and terminal accommodating grooves located at a peripheral edge at the side of the box. Each of the flat conductors has an arc-shaped holding portion and two terminals connected to an upper edge of the arc-shaped holding portion and horizontally bended. The arc-shaped holding portions are accommodated in the circular grooves. The terminals are exposed out of the circular grooves and partially accommodated in the terminal accommodating grooves, respectively. At least one of the terminals has an extending section extending over at least one of the circular grooves. A distance between the extending section and the arc-shaped holding portion of the flat conductor in the at least one circular groove is a fixed value.

10 Claims, 5 Drawing Sheets

(56) References Cited

U.S. PATENT DOCUMENTS

| | | | |
|---|---|---|---|
| 2002/0067094 A1 | 6/2002 | Okazaki et al. | |
| 2007/0232094 A1 | 10/2007 | Hoshika | |
| 2009/0039720 A1 | 2/2009 | Tsukashima et al. | |
| 2009/0058215 A1 | 3/2009 | Murakami et al. | |
| 2010/0141067 A1 | 6/2010 | Kitagawa | |
| 2012/0286593 A1 | 11/2012 | Yokogawa et al. | |
| 2014/0292124 A1 | 10/2014 | Nakamura et al. | |
| 2015/0076944 A1* | 3/2015 | Shim | H02K 3/28 310/71 |
| 2015/0130299 A1 | 5/2015 | Oga et al. | |
| 2015/0137637 A1 | 5/2015 | Jang et al. | |

FOREIGN PATENT DOCUMENTS

| | | |
|---|---|---|
| DE | 102012020329 A1 | 4/2014 |
| DE | 102012024581 A1 | 6/2014 |
| DE | 102014214066 A1 | 1/2016 |
| EP | 0863601 A1 | 9/1998 |
| EP | 2849315 A2 | 3/2015 |
| JP | 2000-333400 A1 | 11/2000 |
| JP | 2011-205817 A | 10/2011 |
| JP | 2014-079090 A1 | 5/2014 |
| JP | 2014-233124 A1 | 12/2014 |
| TW | M251390 U | 11/2004 |
| TW | M459628 U1 | 8/2013 |
| TW | M487574 U | 10/2014 |

\* cited by examiner

FIXING DEVICE FOR JUNCTION WIRES OF STATOR OF MOTOR

This application claims priority to Taiwan Application Serial Number 106100504, filed Jan. 6, 2017, which is herein incorporated by reference.

BACKGROUND

Technical Field

The present disclosure relates to a fixing device for junction wires of a stator of a motor.

Description of Related Art

In the generation that technologies increasingly advance, the electrical motor industry is one of the cores of the modern industries. A motor is an electrical device that converts electrical energy into kinetic energy, and the power and the stability of the motor progress with each passing day. To reduce the motor size and ease of assembly are very important issues of the industry.

However, the processes of wiring a present motor are complicated. Not only is the amount of the used copper wires hard to be reduced, but the convenience of operation is also influenced. Specifically, in the conventional arts, the wiring processes between the wiring coils and conductive coils are performed in manual way, which are more complex and time-consuming, so that the labor costs remain high.

SUMMARY

An aspect of the disclosure is to provide a fixing device for junction wires of a stator of a motor to effectively reduce the volume of the motor and simplify the assembly processes.

According to an embodiment of the disclosure, a fixing device for junction wires of a stator of a motor includes a box and a plurality of flat conductors. The box has a plurality of circular grooves radially arranged at a side of the box. The box further has a plurality of terminal accommodating grooves located at a peripheral edge at the side of the box. Each of the flat conductors includes an arc-shaped holding portion and two terminals connected to an upper edge of the arc-shaped holding portion and horizontally bended. The arc-shaped holding portions are accommodated in the circular grooves. The terminals are exposed out of the circular grooves and partially accommodated in two of the terminal accommodating grooves, respectively. At least one of the terminals has an extending section extending over at least one of the circular grooves. A distance between the extending section and the arc-shaped holding portion of the flat conductor in the at least one circular groove is a fixed value.

In an embodiment of the disclosure, the at least one terminal further includes an elevating section and a wire-junction section. The elevating section is connected between the upper edge of the arc-shaped holding portion and the extending section and exposed out of the circular grooves. The wire-junction section is connected to an end of the extending section opposite to the elevating section.

In an embodiment of the disclosure, the wire-junction section is extended out of the peripheral edge at the side of the box and configured to be fixed with a stator wire-junction terminal.

In an embodiment of the disclosure, the flat conductors include a first flat conductor and a second flat conductor. The first flat conductor includes a first arc-shaped holding portion, a first terminal, and a second terminal. The first and second terminals are connected to an upper edge of the first arc-shaped holding portion and horizontally bended. The second flat conductor includes a second arc-shaped holding portion, a third terminal, and a fourth terminal. The third and fourth terminals are connected to an upper edge of the second arc-shaped holding portion and horizontally bended. The first terminal is located between the third and fourth terminals.

In an embodiment of the disclosure, the first terminal is not in contact with the third and fourth terminals.

In an embodiment of the disclosure, each of the first and second terminals of the first flat conductor includes a first extending section extending over at least one of the circular grooves. Each of the third and fourth terminals of the second flat conductor includes a second extending section extending over at least one of the circular grooves. The first and second extending sections have different lengths.

In an embodiment of the disclosure, the circular grooves include a first circular groove and a second circular groove respectively accommodating the first and second arc-shaped holding portions. The terminal accommodating grooves include two first terminal accommodating grooves and two second terminal accommodating grooves. The first terminal accommodating grooves partially accommodate the first and second terminals, respectively. The second terminal accommodating grooves partially accommodate the third and fourth terminals, respectively. A length of the first extending section is equal to a distance from the first circular groove to any of the first terminal accommodating grooves. A length of the second extending section is equal to a distance from the second circular groove to any of the second terminal accommodating grooves.

In an embodiment of the disclosure, the box further has a plurality of latches. Each of the latches is partially extended to an entrance of a corresponding one of the circular grooves. Each of the arc-shaped holding portions is engaged between a bottom of a corresponding one of the circular grooves and a corresponding one of the latches.

In an embodiment of the disclosure, the fixing device further includes a cover detachably covered at the side of the box. The cover has a plurality of outlet holes. The flat conductors constitute a plurality of windings respectively corresponding to the outlet holes. Each of the outlet holes is aligned with at least a portion of a corresponding one of the windings.

In an embodiment of the disclosure, the flat conductors constitute a plurality of windings. In each of the windings, a sum of lengths of the arc-shaped holding portions of the flat conductors in a circumferential direction and lengths of the terminals in radial directions is substantially close a fixed value.

Accordingly, in the fixing device for junction wires of a stator of a motor of the present disclosure, by making the distances between the extending section of each terminal of each flat conductor and the arc-shaped holding portion(s) of the other flat conductor(s) in the circular groove(s) extended over by the extending section be close to a fixed value and adjusting the cross-sectional areas of the flat conductors, each of the flat conductors can obtain the same flux impedance. By designing the elevating section for each terminal, each extending section can be prevented from contacting the arc-shaped holding portion(s) extended over by the extending section, so the problem caused by short circuit can be effectively avoided. By designing the wire-junction sections of all terminals with the same length (i.e., the distal ends of all wire-junction sections are substantially arranged on a circle), the wire-junction sections can be convenient to be fixed with the stator wire-junction terminals. By disposing the latch at the entrance of the corresponding circular groove to engage the corresponding flat conductor, the corresponding arc-shaped holding portion can be effectively prevented from jumping out of the corresponding circular groove owing to vibration. Moreover, by making the sum of the lengths of each winding be close to a fixed value and then locally adjusting the shape of the flat conductors, the purpose of making the windings obtain totally the same impedance can be achieved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
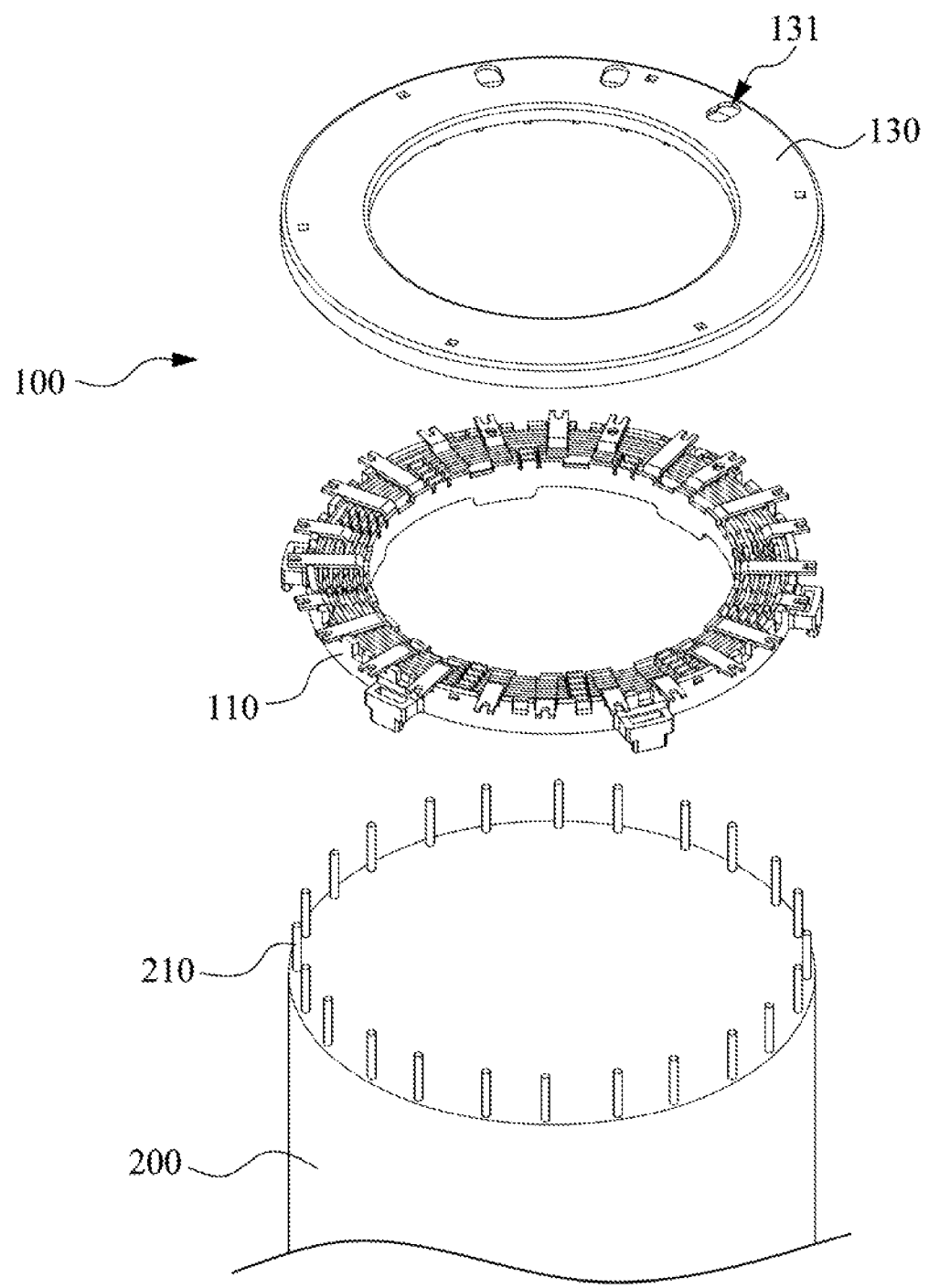
FIG. 1 is an exploded view of a motor and a fixing device for junction wires of a stator of a motor according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
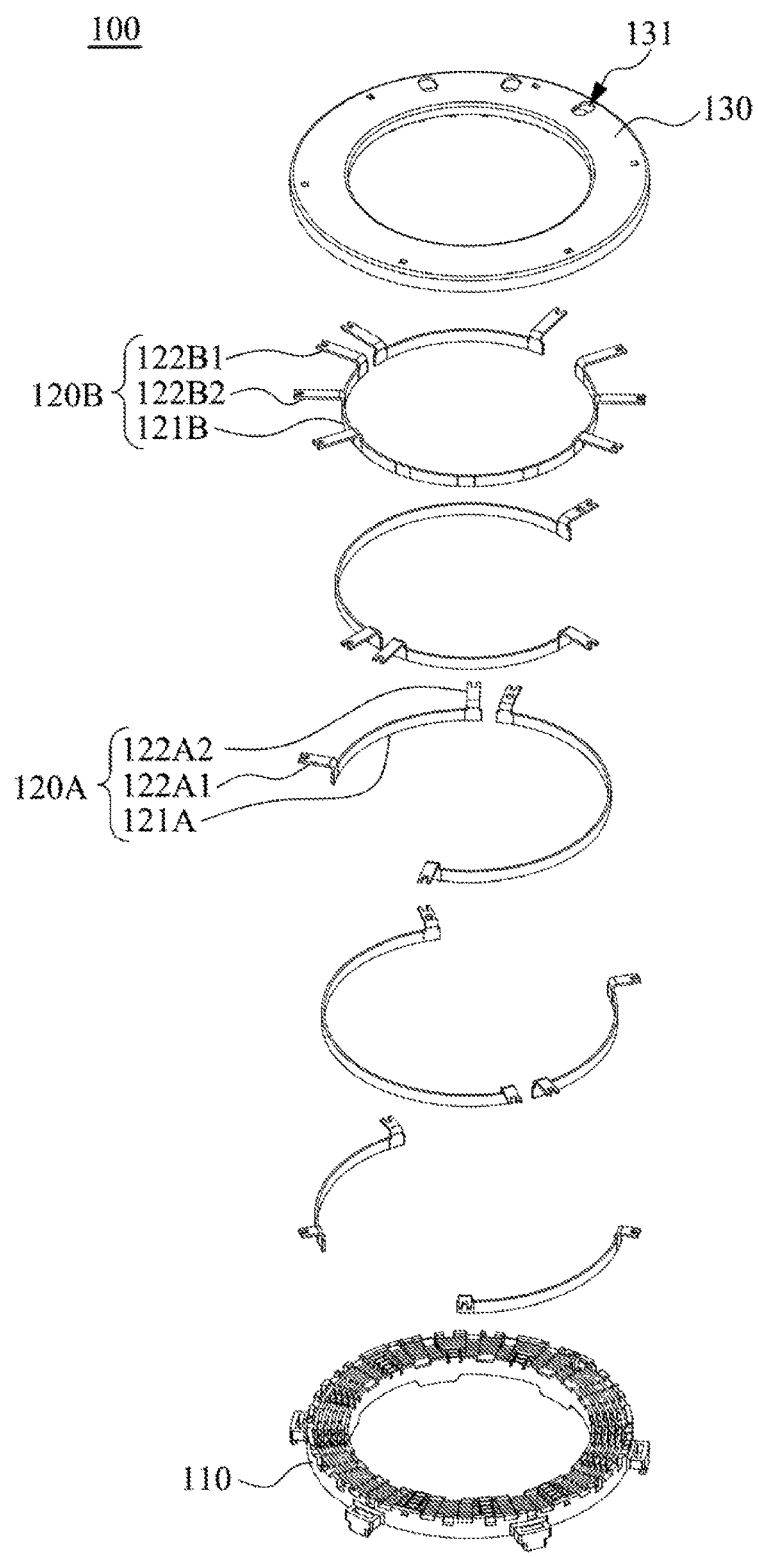
FIG. 2 is an exploded view of the fixing device in FIG. 1.
Figure 3:
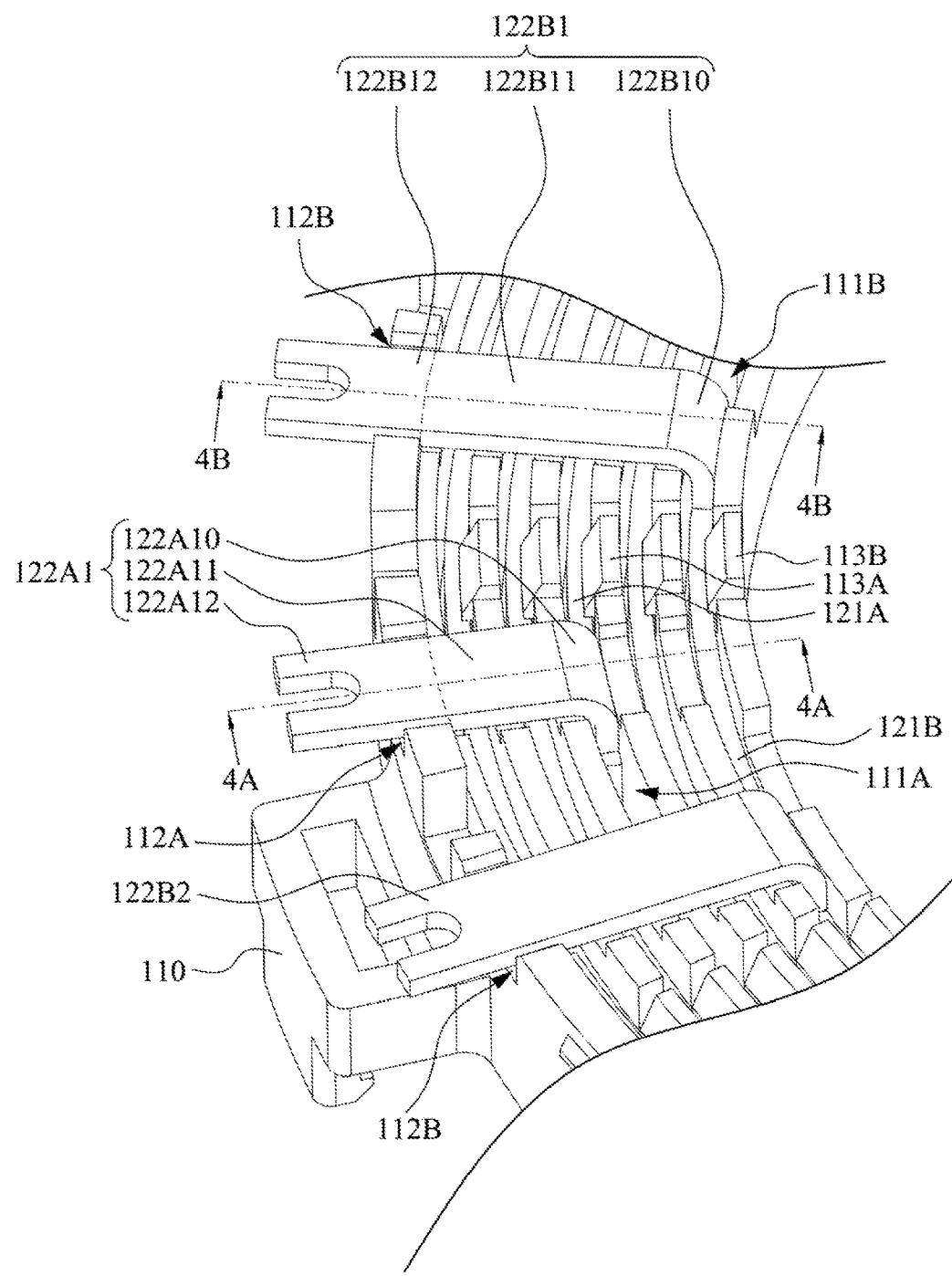
FIG. 3 is an enlarged view of the fixing device for junction wires of a stator of a motor according to an embodiment of the disclosure, in which flat conductors are accommodated in circular grooves.

Reference is made to FIGS. 1-3. FIG. 1 is an exploded view of a motor 200 and a fixing device 100 for junction wires of a stator of a motor according to an embodiment of the disclosure. FIG. 2 is an exploded view of the fixing device 100 in FIG. 1. FIG. 3 is an enlarged view of the fixing device 100 for junction wires of a stator of a motor according to an embodiment of the disclosure, in which flat conductors are accommodated in circular grooves.

As shown in FIGS. 1-3, in the embodiment, the fixing device 100 for junction wires of a stator of a motor includes a box 110 and a plurality of flat conductors. The box 110 has a plurality of circular grooves. The circular grooves are radially arranged at a side of the box 110. The box 110 further has a plurality of terminal accommodating grooves. The terminal accommodating grooves and the circular grooves are located at the same side of the box 110, and the terminal accommodating grooves are located at a peripheral edge of the box 110.

For example, as shown in FIG. 3, the fixing device 100 at least includes a first flat conductor 120A and a second flat conductor 120B. The box 110 at least has a first circular groove 111A and a second circular groove 111B. The first circular groove 111A and the second circular groove 111B are radially arranged with a circular groove located therebetween. The box 110 further at least has first terminal accommodating grooves 112A and second terminal accommodating grooves 112B. The first terminal accommodating grooves 112A, the second terminal accommodating grooves 112B, the first circular groove 111A and the second circular groove 111B are located at the same side of the box 110, and the first terminal accommodating grooves 112A and the second terminal accommodating grooves 112B are located at the peripheral edge of the box 110.

Furthermore, each of the flat conductors includes an arc-shaped holding portion and two terminals connected to an upper edge of the arc-shaped holding portion and horizontally bended. The arc-shaped holding portions are accommodated in the circular grooves. The terminals are exposed out of the circular grooves and partially accommodated in two of the terminal accommodating grooves, respectively.

For example, as shown in FIG. 3, the first flat conductor 120A and the second flat conductor 120B respectively include a first arc-shaped holding portion 121A and a second arc-shaped holding portion 121B. The first flat conductor 120A further includes a first terminal 122A1 and a second terminal 122A2 that are connected to an upper edge of the first arc-shaped holding portion 121A and horizontally bended. The second flat conductor 120B further includes a third terminal 122B1 and a fourth terminal 122B2 that are connected to an upper edge of the second arc-shaped holding portion 121B and horizontally bended. The first arc-shaped holding portion 121A and the second arc-shaped holding portion 121B are respectively accommodated in the first circular groove 111A and the second circular groove 111B. The first terminal 122A1 and the second terminal 122A2 are exposed out of the first circular groove 111A and respectively accommodated in two first terminal accommodating grooves 112A. The third terminal 122B1 and the fourth terminal 122B2 are exposed out of the second circular groove 111B and respectively accommodated in two second terminal accommodating grooves 112B.

Specifically, in the embodiment, at least one terminal among all of the flat conductors has an extending section. The extending section extends over at least one of the circular grooves. A distance between the extending section and the arc-shaped holding portion of the flat conductor in the at least one circular groove is a fixed value.

Figure 4A:
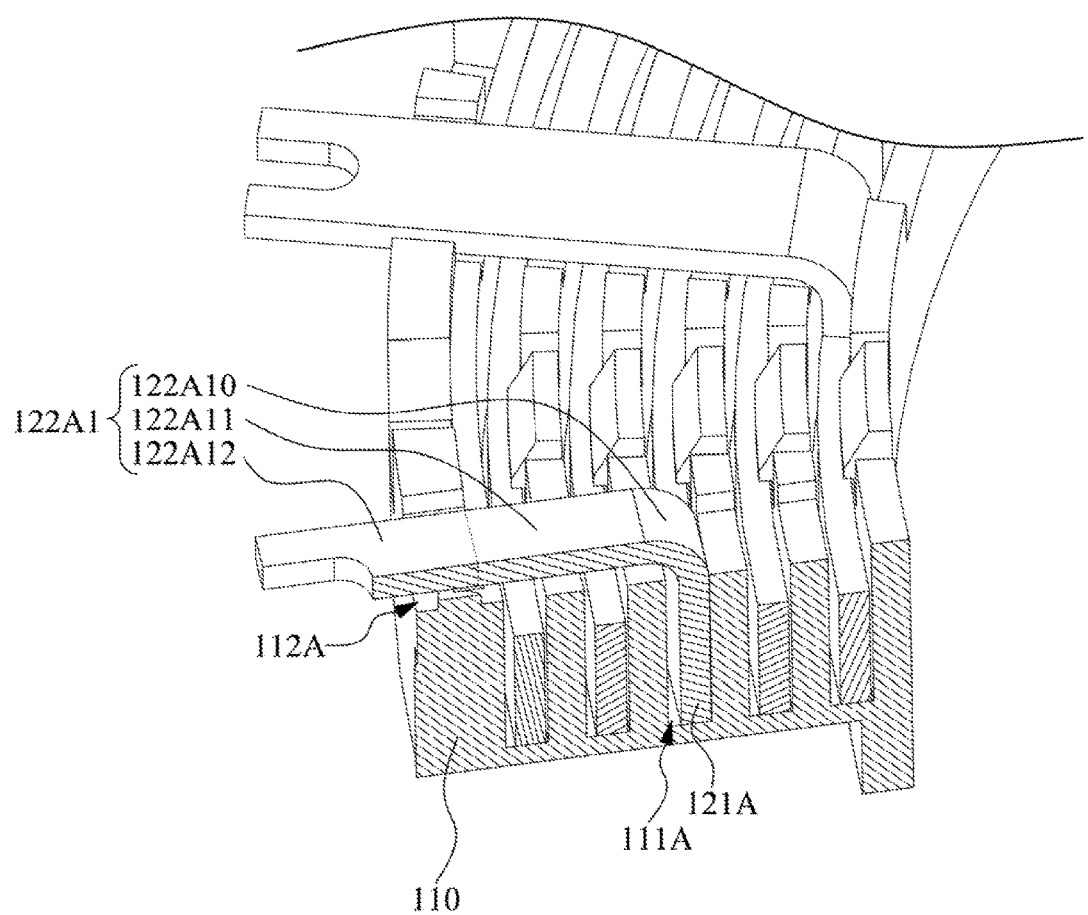
FIG. 4A is a partial cross-sectional view of the structure in FIG. 3 taken along line 4A-4A.
Figure 4B:
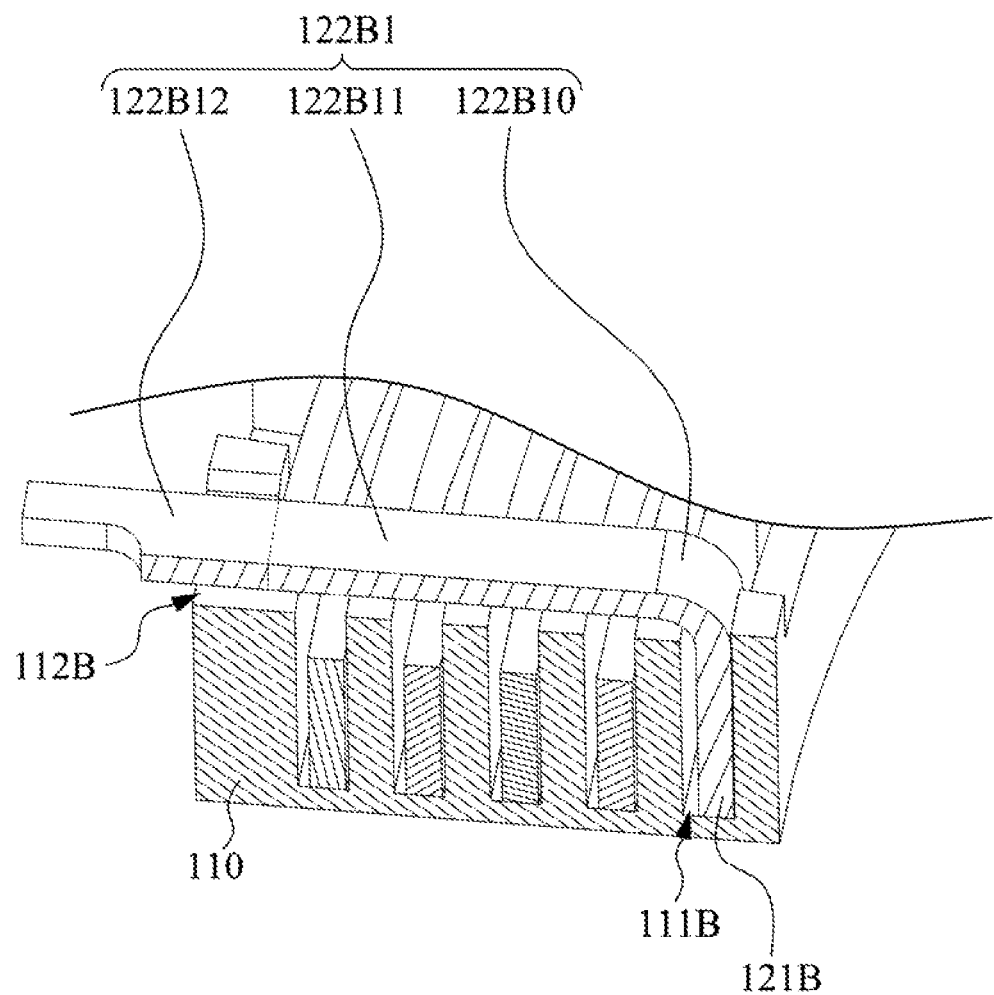
FIG. 4B is a partial cross-sectional view of the structure in FIG. 3 taken along line 4B-4B.

For example, reference is made to FIGS. 3-4B. FIG. 4A is a partial cross-sectional view of the structure in FIG. 3 taken along line 4A-4A. FIG. 4B is a partial cross-sectional view of the structure in FIG. 3 taken along line 4B-4B. As shown in FIGS. 3-4B, each of the first terminal 122A1 and the second terminal 122A2 of the first flat conductor 120A includes a first extending section 122A11 (the reference label is only made to the first terminal 122A1 in FIGS. 3 and 4A). The first extending section 122A11 extends over two circular grooves. In addition, each of the third terminal 122B1 and the fourth terminal 122B2 of the second flat conductor 120B includes a second extending section 122B11 (the reference label is only made to the third terminal 122B1 in FIGS. 3 and 4B). The second extending section 122B11 extends over four circular grooves (including the first circular groove 111A). Because extending over different numbers of circular grooves, the first extending section 122A11 and the second extending section 122B11 have different lengths. In the embodiment, the length of the first extending section 122A11 is defined by the distance from the first circular groove 111A to any of the first terminal accommodating grooves 112A, and the length of the second extending section 122B11 is defined by the distance from the second circular groove 111B to any of the second terminal accommodating grooves 112B. In addition, the first terminal 122A1 is located between the third terminal 122B1 and the fourth terminal 122B2, and the first terminal 122A1 is not in contact with the third terminal 122B1 and the fourth terminal 122B2.

Specifically, a distance between the first extending section 122A11 and each of the arc-shaped holding portions of the flat conductors in two circular grooves extended by the first extending section 122A11 and a distance between the second extending section 122B11 and each of the arc-shaped holding portions of the flat conductors in four circular grooves extended by the second extending section 122B11 are the same and equal to a fixed value. In other words, for an extending section which extends over an arc-shaped holding portion in at least one circular groove, the distance between the extending section and the arc-shaped holding portion is equal to a fixed value. With the structural configuration, at least one technical effect of achieved by the fixing device 100 of the embodiment is that the flux impedance of each flat conductor can be easily estimated.

In detail, each terminal further includes an elevating section and a wire-junction section. The elevating section is connected between the upper edge of the arc-shaped holding portion and the extending section and exposed out of the circular grooves. The wire-junction section is connected to the extending section opposite to the elevating section. Moreover, the wire-junction section is extended out of the peripheral edge of the box 110 and configured to be fixed with a stator wire-junction terminal 210 of the motor 200 (referring to FIG. 1).

For example, as shown in FIGS. 3 and 4A, each of the first terminal 122A1 and the second terminal 122A2 further includes a first elevating section 122A10 and a second wire-junction section 122A12 (the reference labels are only made to the first terminal 122A1 in FIGS. 3 and 4A). The first elevating section 122A10 is connected between the upper edge of the first arc-shaped holding portion 121A and the first extending section 122A12 and exposed out of the first circular groove 111A. The first wire-junction section 122A12 is connected to an end of the first extending section 122A11 opposite to the first elevating section 122A10. As shown in FIGS. 3 and 4B, each of the third terminal 122B1 and the fourth terminal 122B2 further includes a second elevating section 122B10 and a second wire-junction section 122B12 (the reference labels are only made to the third terminal 122B1 in FIGS. 3 and 4B).

The second elevating section 122B10 is connected between the upper edge of the second arc-shaped holding portion 121B and the second extending section 122B12 and exposed out of the second circular groove 111B. The second wire-junction section 122B12 is connected to an end of the second extending section 122B11 opposite to the second elevating section 122B10.

It should be pointed out that by designing the elevating section for each terminal, each extending section can be prevented from contacting the arc-shaped holding portion(s) extended over by the extending section, so the problem caused by short circuit can be effectively avoided. Furthermore, even though the arc-shaped holding portions of the flat conductors are located in different circular grooves, the wire-junction sections of the flat conductors can extend out of the peripheral edge of the box 110 respectively by the extending sections having different lengths. Moreover, the wire-junction sections of all flat conductors in the embodiment have the same length (i.e., the distal ends of all wire-junction sections are substantially arranged on a circle), so the wire-junction sections can be convenient to be fixed with the stator wire-junction terminals 210 of the motor 200.

As shown in FIG. 3, in the embodiment, the box 110 further has a plurality of latches. Each of the latches is partially extended to an entrance of a corresponding one of the circular grooves. Each of the arc-shaped holding portions is engaged between a bottom of a corresponding one of the circular grooves and a corresponding one of the latches. With the latches, the arc-shaped holding portion of every flat conductor can be effectively prevented from jumping out of the corresponding circular groove owing to the vibration caused during the operation of the motor 200.

For example, the box 110 at least has a first latch 113A and a second latch 113B. The first latch 113A and the second latch 113B are partially extended to entrances of the first circular groove 111A and the second circular groove 111B, respectively. The first arc-shaped holding portion 121A is engaged between the bottom of the first circular groove 111A and the first latch 113A, and the second arc-shaped holding portion 121B is engaged between the bottom of the second circular groove 111B and the second latch 113B.

In some embodiments, the box 110 can be made of insulating materials (e.g., plastics), so as to prevent the flat conductors from electrically connecting to form short circuits. In some embodiments, the box 110 can be made of a material with elasticity or plasticity. Hence, when the arc-shaped holding portion of any flat conductor is to be installed in the corresponding circular groove, the corresponding latch can be pushed away by the arc-shaped holding portion and then can restore and engage the arc-shaped holding portion after the arc-shaped holding portion is entirely accommodated in the circular groove.

As shown in FIGS. 1 and 2, in the embodiment, the fixing device 100 further includes a cover 130. The cover 130 is detachably covered at the side of the box 110 having the circular grooves and the terminal accommodating grooves. The cover 130 has a plurality of outlet holes 131. The flat conductors constitute a plurality of windings respectively corresponding to the outlet holes 131. Each of the outlet holes 131 is aligned with at least a portion of a corresponding one of the windings.

For example, in the embodiment, the flat conductors of the fixing device 100 constitute three windings, and the cover 130 correspondingly has three outlet holes 131 aligned with at least a portion of the windings, respectively. Hence, the three windings can be electrically connected to three power lines through the three outlet holes 131, respectively (referring to FIG. 1).

In some embodiments, a sum of lengths of the arc-shaped holding portions of the flat conductors in a circumferential direction and lengths of the terminals in radial directions of each winding is substantially close a fixed value. For example, all arc-shaped holding portions in a circumferential direction and all terminals in radial directions of one winding respectively have a first length and a second length, and all arc-shaped holding portions in a circumferential direction and all terminals in radial directions of another winding respectively have a third length and a fourth length. By making the sum of the first and second lengths and the sum of the third and fourth lengths substantially be close to the same value, the fixing device 100 of the embodiment can make the impedances of the two windings be very close to each other. Afterwards, in order to achieve the purpose of making the windings obtain totally the same impedance, the shape of the flat conductors can be locally adjusting (e.g., locally removing the material of the flat conductors).

In other words, during the manufacturing of the fixing device 100 of the embodiment, the impedances of the windings can be roughly adjusted by making the lengths of the flat conductors of the windings be close to each other and then be finely adjusted by locally adjusting the shape of the flat conductors, so as to achieve the purpose of making the windings obtain totally the same impedance.

According to the foregoing recitations of the embodiments of the disclosure, it can be seen that in the fixing device for junction wires of a stator of a motor of the present disclosure, by making the distances between the extending section of each terminal of each flat conductor and the arc-shaped holding portion(s) of the other flat conductor(s) in the circular groove(s) extended over by the extending section be close to a fixed value and adjusting the cross-sectional areas of the flat conductors, each of the flat conductors can obtain the same flux impedance. By designing the elevating section for each terminal, each extending section can be prevented from contacting the arc-shaped holding portion(s) extended over by the extending section, so the problem caused by short circuit can be effectively avoided. By designing the wire-junction sections of all terminals with the same length (i.e., the distal ends of all wire-junction sections are substantially arranged on a circle), the wire-junction sections can be convenient to be fixed with the stator wire-junction terminals. By disposing the latch at the entrance of the corresponding circular groove to engage the corresponding flat conductor, the corresponding arc-shaped holding portion can be effectively prevented from jumping out of the corresponding circular groove owing to vibration. Moreover, by making the sum of the lengths of each winding be close to a fixed value and then locally adjusting the shape of the flat conductors, the purpose of making the windings obtain totally the same impedance can be achieved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fixing device for junction wires of a stator of a motor, the fixing device comprising:
    a box having a plurality of circular grooves radially arranged at a side of the box, the box further having a plurality of terminal accommodating grooves located at a peripheral edge at the side of the box; and
    a plurality of flat conductors, each of the flat conductors comprising an arc-shaped holding portion and two terminals connected to an upper edge of the arc-shaped holding portion and horizontally bended, wherein the arc-shaped holding portions are accommodated in the circular grooves, the terminals are exposed out of the circular grooves and partially accommodated in two of the terminal accommodating grooves, respectively, a number of the arc-shaped holding portions accommodated in one of the circular grooves is plural, and the arc-shaped holding portions accommodated in said one of the circular grooves have different lengths in a circumferential direction,
    wherein at least one of the terminals has an extending section extending over at least one of the circular grooves, and a distance between the extending section and the arc-shaped holding portion of the flat conductor in the at least one circular groove is a fixed value.

2. The fixing device of claim 1, wherein the at least one terminal further comprises:
    an elevating section connected between the upper edge of the arc-shaped holding portion and the extending section and exposed out of the circular grooves; and
    a wire-junction section connected to an end of the extending section opposite to the elevating section.

3. The fixing device of claim 2, wherein the wire-junction section is extended out of the peripheral edge at the side of the box and configured to be fixed with a stator wire-junction terminal.

4. The fixing device of claim 1, wherein the flat conductors comprise:
    a first flat conductor comprising a first arc-shaped holding portion, a first terminal, and a second terminal, and the first and second terminals are connected to an upper edge of the first arc-shaped holding portion and horizontally bended; and
    a second flat conductor comprising a second arc-shaped holding portion, a third terminal, and a fourth terminal, and the third and fourth terminals are connected to an upper edge of the second arc-shaped holding portion and horizontally bended,
    wherein the first terminal is located between the third and fourth terminals.

5. The fixing device of claim 4, wherein the first terminal is not in contact with the third and fourth terminals.

6. The fixing device of claim 4, wherein each of the first and second terminals of the first flat conductor comprises a first extending section extending over at least one of the circular grooves, each of the third and fourth terminals of the second flat conductor comprises a second extending section extending over at least one of the circular grooves, and the first and second extending sections have different lengths.

7. The fixing device of claim 6, wherein the circular grooves comprise a first circular groove and a second circular groove respectively accommodating the first and second arc-shaped holding portions, the terminal accommodating grooves comprise two first terminal accommodating grooves and two second terminal accommodating grooves, the first terminal accommodating grooves respectively partially accommodate the first and second terminals, the second terminal accommodating grooves respectively partially accommodate the third and fourth terminals, a length of the first extending section is equal to a distance from the first circular groove to any of the first terminal accommodating grooves, and a length of the second extending section is equal to a distance from the second circular groove to any of the second terminal accommodating grooves.

8. The fixing device of claim 1, wherein the box further has a plurality of latches, each of the latches is partially extended to an entrance of a corresponding one of the circular grooves, and each of the arc-shaped holding portions is engaged between a bottom of a corresponding one of the circular grooves and a corresponding one of the latches.

9. The fixing device of claim 1, further comprising a cover detachably covered at the side of the box, the cover having a plurality of outlet holes, wherein the flat conductors constitute a plurality of windings respectively corresponding to the outlet holes, and each of the outlet holes is aligned with at least a portion of a corresponding one of the windings.

10. The fixing device of claim 1, wherein the flat conductors constitute a plurality of windings, and in each of the windings, a sum of lengths of the arc-shaped holding portions of the flat conductors in the circumferential direction and lengths of the terminals in radial directions is substantially close a fixed value.

\* \* \* \* \*